July 19, 1949.　　　　　F. H. BOGART　　　　　2,476,693
MACHINE TOOL CHUCK ACTUATOR
Filed Aug. 10, 1944　　　　　　　　　　　　　　3 Sheets-Sheet 1

INVENTOR.
FRED H. BOGART
BY
Kwis Hudson, Baighton & Williams
ATTORNEYS

July 19, 1949.                F. H. BOGART                2,476,693
                        MACHINE TOOL CHUCK ACTUATOR
Filed Aug. 10, 1944                                3 Sheets-Sheet 2

INVENTOR.
FRED H. BOGART
BY
Kwis Hudson Boughton & Williams
ATTORNEYS

July 19, 1949. F. H. BOGART 2,476,693
MACHINE TOOL CHUCK ACTUATOR
Filed Aug. 10, 1944 3 Sheets-Sheet 3

INVENTOR.
FRED H. BOGART
BY
ATTORNEYS

Patented July 19, 1949

2,476,693

UNITED STATES PATENT OFFICE 2,476,693

MACHINE TOOL CHUCK ACTUATOR

Fred H. Bogart, South Euclid, Ohio, assignor to The Warner & Swasey Company, Cleveland, Ohio, a corporation of Ohio Application August 10, 1944, Serial No. 548,829

35 Claims. (Cl. 279—4)

This invention relates to a machine tool and more particularly to means for operating the chuck closing and opening mechanism of a machine tool.

Heretofore machine tools have had the mechanism for opening and closing the chucks operated entirely manually or entirely by power driven means. In the manual operation of the chuck opening and closing mechanisms of a machine tool frequently a considerable degree of force is required to operate such mechanisms to effect adequate closing of the chuck jaws to properly grip the element held by the chuck. It may be difficult for the operator of the machine tool to manually apply the necessary force to correctly close the chuck and furthermore the operator may believe the requisite force has been applied to correctly close the chuck when as a matter of fact such is not the case.

An object of the present invention is to provide in the chuck actuating mechanism of a machine tool power means for supplementing the manual force applied to such mechanism by the operator in actuating the same.

Another object is to provide an arrangement such as specified in the last mentioned object and wherein the power means becomes effective to supplement the manual force applied to the chuck actuating mechanism when the resistance to the manual actuation of said mechanism reaches a predetermined amount.

A further object is to provide in the chuck actuating mechanism of a machine tool provision for supplementing the manual force applied to such mechanism by the operator with a power produced force, and wherein the operator in actuating the chuck closing mechanism manually moves the actuating handle or lever in the regular and customary manner.

A still further object is to provide an arrangement such as specified in the last named object and wherein the manual force is automatically supplemented by a power derived force when the resistance to the manual force reaches a predetermined amount and such power derived force is applied in a manner to effect the proper closing of the chuck.

A still further object is to provide an arrangement such as specified in the hereinbefore stated objects and which arrangement is efficient in operation and is simple in design and construction.

Although the invention may be embodied in the actuating mechanism of different types of chucks used in machine tools, it will be described herein as embodied in the actuating mechanism of a collet chuck mounted in a rotating spindle of a machine tool.

Referring to the accompanying drawings illustrating an embodiment of the invention.

Figure 1:
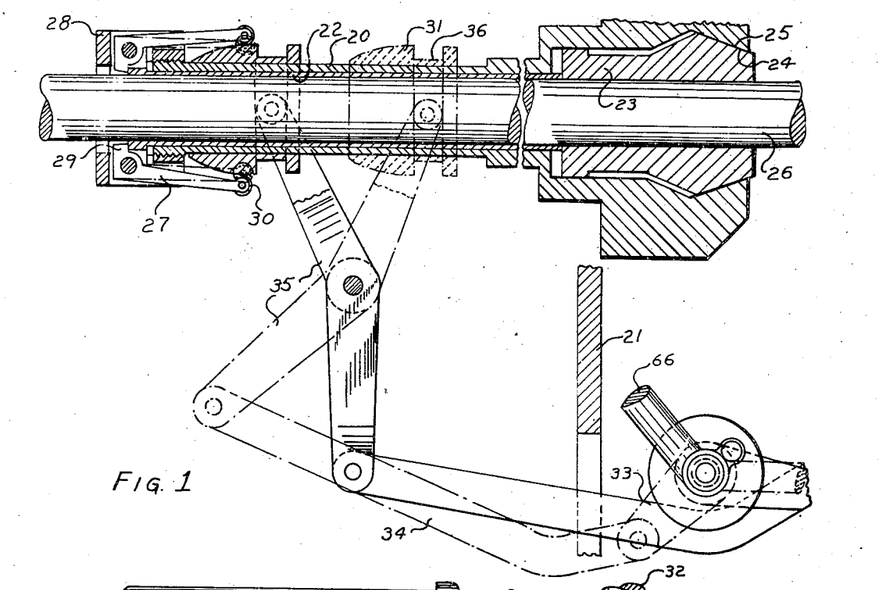
Fig. 1 is a somewhat diagrammatic view illustrating in section a portion of a work spindle of a machine tool and having a collet chuck mounted therein, with certain parts of the chuck actuating mechanism also shown in section while other parts thereof are shown in front elevation; the full line illustration of the relation of the parts being the position they occupy when the collet chuck is closed and is gripping the work piece, while the dash and dot line illustration of such parts is the position they occupy when the collet chuck is open and the work piece is free to be fed therethrough.
Figure 2:
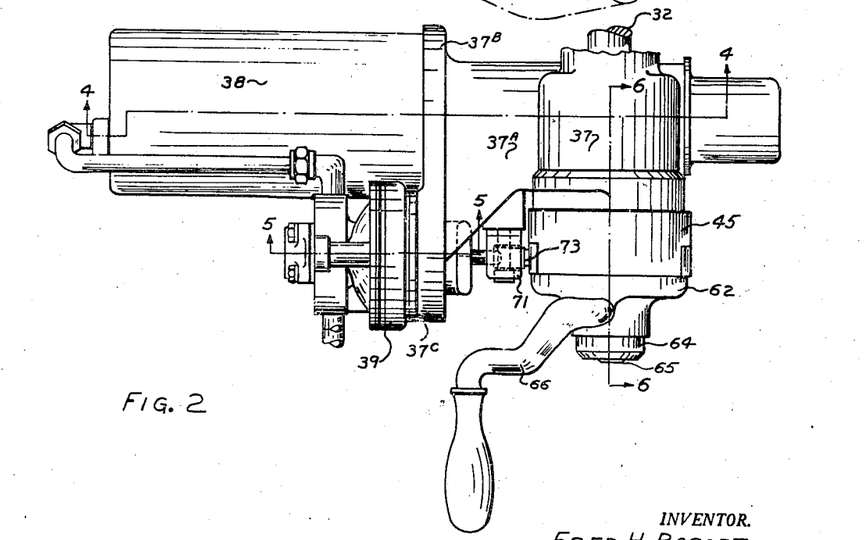
Fig. 2 is a top plan view of the chuck actuating mechanism embodying the invention and shows that portion of said mechanism which is located on the exterior of the machine tool, the operative connections between the rockable shaft of the mechanism and the chuck being omitted.
Figure 3:
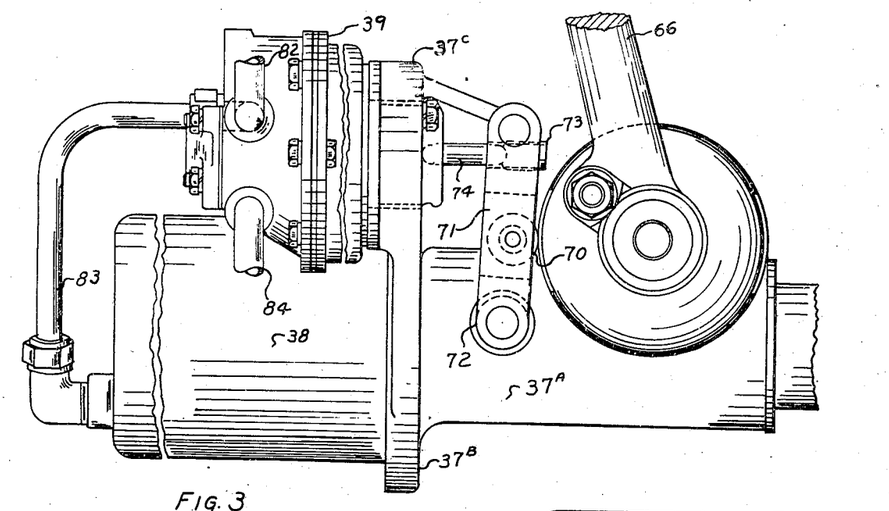
Fig. 3 is a front elevational view of the portion of the chuck actuating mechanism shown in Fig. 2 and is taken looking from the lower side of Fig. 2.

As previously stated, the invention may be embodied in the manually operated actuating mechanism of various forms of chucks used in various types of machine tools and the application of the invention to the manually operated actuating mechanism of a collet chuck is merely by way of illustration and not by way of limitation. Also by way of illustration the collet chuck is shown as mounted in the rotatable work spindle 20 of a lathe and which spindle is supported in the headstock of the lathe as will be well understood in the art, a portion of which headstock is indicated in Fig. 1 at 21. The spindle 20 houses an endwise movable collet operating sleeve 22 which when moved in one direction shifts the collet 23 to cause the cooperating inclined surfaces 24 and 25 to move the spring jaws of the collet into gripping relation with the stock 26 as will be well understood in the art. When the pressure on the collet operating sleeve 22 is released the spring jaws of the collet cause the collet to shift in the opposite direction with a resulting opening of the collet jaws and an endwise movement of the sleeve 22 in said opposite direction as will be well understood in the art.

The collet actuating sleeve 22 is moved to cause the collet to grip the stock by means of fingers 27 pivoted in a supporting element 28 secured to the spindle 20. The fingers 27 have heel portions 29 which engage the end of the sleeve 22 and said fingers are provided also with rollers 30 which cooperate with a finger actuating cone 31 that is slidable axially of the spindle 20. When the cone 31 is in the position shown by dot and dash lines in Fig. 1 the collet jaws are open and the stock 26 may be fed through the spindle by any suitable means not disclosed but well understood in the art. When the cone 31 is in the full line position of Fig. 1 the collet jaws are closed and the collet is tightly gripping the stock and machining operations can be performed on the latter. It will be seen that as the cone 31 moves from the dot and dash line position of Fig. 1 toward its full line position therein the conical surface of the cone contacts the rollers 30 and spreads the fingers 27 to cause the heel portions 29 thereof to shift the sleeve 22 toward the right as viewed in the drawing to effect closure of the collet. The contour of the cone is so designed as to provide the proper leverage and closing movements to the collet paws, it being noted that the cone 31 is provided with a cylindrical portion on which the rollers 30 rest when the collet is fully closed. The feeding of the stock when the collet is released takes place as the cone 30 is moving from the dash-dot line position of Fig. 1 to the position where the rollers 30 first contact the conical surface of the cone. The construction just described is well known in the art and need not be explained in greater detail.

The cone 31 is shifted axially of the spindle 20 to effect opening and closing of the collet by the rocking movement of a shaft 32 which is suitably supported in the headstock and projects horizontally from the front side of the headstock as will be well understood. The rocking movements of the shaft 32 may be transmitted to the cone 31 to impart axial shifting movements thereto by various forms of mechanisms well known in the art.

In Fig. 1 the shaft 32 is shown as operatively connected to the cone 31 by means of a short lever arm 33 fixed to the inner end of the shaft 32 within the headstock and having its free end pivotally connected to the angular end of a link 34. The opposite end of the link 34 is pivotally connected to a lever 35 that is pivotally supported by the headstock intermediate the ends of the lever. The lever 35 at its upper end is provided with a fork which straddles the cone 31 and has rollers engaging in the annular groove 36 formed in said cone.

The shaft 32 is rockably supported in suitable bearings within the headstock, not shown, as will be well understood and as previously stated said shaft projects outwardly of the front side of the headstock and extends into a housing 37 secured to the front side of the headstock in any suitable manner as for instance by means of a flange (not shown) on the housing and which flange is bolted or otherwise secured to the headstock. The housing 37 is provided with an upper portion that extends axially of the shaft 32 and in which the shaft is supported for rocking movements. The housing 37 has a portion 37a extending transversely of the shaft supporting upper portion and said housing portion 37a slidably supports a rack later to be referred to. The portion 37a is provided with a flange 37b and has secured thereto a cylinder 38 which projects from the housing in longitudinal extension of the rack above mentioned and which cylinder will be described in detail hereinafter. The flange 37b of the housing portion 37a has an extension 37c forming a supporting bracket for a valve 39.

The shaft 32 is rockably supported in the housing 37 in a bearing bushing 40 fixed in said housing. To the right or outwardly of the bushing 40 a gear 41 having an integral elongated sleeve 42 is mounted on the shaft 32 and said gear and sleeve are keyed to said shaft. A bushing 43 is fixedly mounted in the housing 37 to the right of the gear 41 as viewed in Fig. 6 and said bushing rockably supports the sleeve 42 of the gear 41 and the latter is held against axial displacement by the bushing 43 and by the bearing bushing 40. The gear 43 extends into the portion 37a of the housing and meshes with the rack teeth formed on the upper side of the rack 44 which slides on the lower wall of the portion 37a of the housing and in a direction transverse to the axis of the shaft 32. A cam slide supporting member 45 is mounted on the shaft 32 in extension of the housing 37, said member having a reduced portion 45a extending into the housing 37 and contacting the bushing 43 with said member including its extension supported by the sleeve 42 of the gear 41 and keyed thereto as indicated at 46.

From the description thus far given it will be apparent that the gear 41, its sleeve 42, the cam slide supporting member 45 and the shaft 32 will rock in unison since these elements are keyed together.

Figure 6:
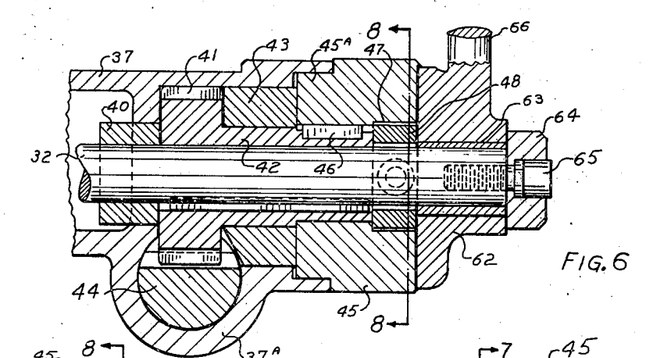
Fig. 6 is a sectional view taken approximately along line 6—6 of Fig. 2, looking in the direction of the arrows.
Figure 7:
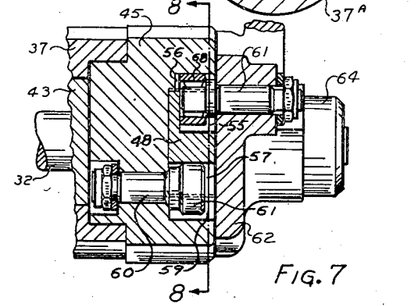
Fig. 7 is a sectional view taken along line 7—7 of Fig. 8, looking in the direction of the arrows.
Figure 8:
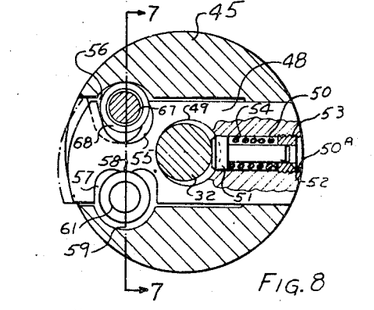
Fig. 8 is a sectional view taken along lines 8—8 of Figs. 6 and 7, looking in the direction of the arrows, and showing in full lines the relationship of certain parts prior to the application of the power derived force to the chuck actuating mechanism and showing by dot and dash lines the relationship of said parts after the power derived force has started to be applied to said actuating mechanism.

The member 45 adjacent its right hand end as viewed in Fig. 6 is provided with a diametrically extending recess 47 in which is slidably supported a cam slide 48. The cam slide 48 is provided with an opening 49 of larger diameter than the shaft 32, and through which opening said shaft extends, see Fig. 8, wherefore the slide 48 can have limited linear movement transversely of the axis of the shaft 32. The slide 48 adjacent its right hand end, as viewed in Fig. 8, is provided with a bore 50 extending longitudinally of the slide and in a direction radial of the opening 49. The outer end of this recess 50 is threaded as indicated at 50a. A plunger is mounted for movement in the recess and said plunger comprises a cylindrical head 51 slidably interfitting the recess and located at the inner end thereof. A stem 52 extends outwardly from the head 51 and is slidably supported in the central opening of a threaded collar 53 that is screwed into the threaded outer end 50a of the bore 50. A coil spring 54 sourrounds the stem 52 of the plunger and has its opposite ends abutting the collar 53 and the head 51 and said spring urges said head inwardly of the bore 50 and into engagement with the circumference of the shaft 32 as shown in Fig. 8, to maintain the slide 48 normally in its full line position with the circumference of the shaft 32 in contact with the left hand side of the opening 49 as viewed in Fig. 8. The spring 54 is of predetermined and selected strength for a purpose later to be explained. The slide 48 on its upper side and adjacent its left hand end as viewed in Fig. 8 is provided with a substantially U-shaped recess 55 and having its open end normally cooperating with an arcuate recess 56 formed in the member 45 for a purpose later to be explained. The opposite or lower edge of the slide 48, as viewed in Fig. 8, is provided with a wider substantially U-shaped recess 57 provided midway of its bottom with a raised surface 58 for a purpose later to become apparent. The open end of the recess 57 cooperates with an arcuate recess 59 formed in the member 45. The member 45 fixedly carries a stud 60 which extends parallel to the shaft 32 and into the cooperating recesses 57 and 59 and at which point it mounts a roller 61 the circumference of which is always in contact with the raised portion 58 of the bottom of the recess 57, with the result that the roller slidably supports the slide 48 and since the sides of the recess 57 will contact said roller 61 after the slide 48 has moved a predetermined distance in either direction the roller also acts as a limit stop to the linear movement of the slide.

The shaft 32 extends beyond the member 45, to the right thereof as viewed in Fig. 6, and on this extended end of the shaft a hub 62 is mounted with a bushing sleeve 63 interposed between the hub and the shaft. The hub is secured to the shaft against axial movement relative thereto by means of a clamping collar 64 having a centrally disposed bore and counterbore in which is located a head cap screw 65 that is screwed into a threaded recess in the end of the shaft 32. The hub 62 has an operating handle 66 extending upwardly therefrom and said handle in the present illustration is shown as formed integral with the hub. The hub 62 is provided with a bore in which is secured a stud 67 that extends into the recess 56 of the member 45 and the recess 55 of the slide 48, said stud being disposed parallel to the axes of the shaft 32 and the stud 60. The inner or left hand end of the stud 67 rotatably supports a roller 68 and which roller is located in the cooperating recesses 55 and 56 and will function in a manner hereinafter to be explained.

Referring again to the slide 48, and particularly to Figs. 8 to 11, the left hand end of said slide is shown as provided with a cam surface 69, the high point of which is indicated as approximately at 69a and is located at the lower portion of the cam surface as shown in the drawings. The cam surface 69 is adapted under certain operative conditions and at certain periods in the cycle of operation of the mechanism to engage and act on a roller 70 in a manner hereinafter explained. The roller 70 is rotatably mounted on a pin carried by lever 71 intermediate the ends of said lever. The lower end of the lever 71 is pivotally connected to a boss formed on the housing 37a as indicated at 72. The lever 71 adjacent its upper end is provided with an opening therethrough extending transversely of the axis of the roller 70 and the lever 71 and having mounted therein an adjustable hollow setscrew 73, the inner end of which cooperates with a valve actuating plunger 74 which has one end extending into the lever opening and its opposite end extending into a portion of the valve 39 now to be described in detail.

The valve 39 may be of any suitable construction which will function to control the admission of pressure fluid to the cylinder 38 and which will vent said cylinder to atmosphere when the flow of pressure fluid thereto is terminated. As illustrative of a form of valve which may be used reference is made to the sectional and somewhat diagrammatic illustration of Fig. 5. The valve housing at its opposite ends is formed with extensions 39a and 39b with the extension 39a extending into and supported by the flange portion 37b of the housing 37a. The portion 39b of the valve casing contains the inlet or supply chamber 75 and said chamber is separated from the pressure chamber 76 by a wall 77 which is provided with an opening 78 and has an integral tubular wall portion 79 extending into the supply chamber 75. A diaphragm 80 is carried by the valve casing and separates the pressure chamber 76 from an exhaust chamber 81. The supply chamber 75 is connected to a source of supply of pressure fluid by a conduit 82, while the pressure chamber 76 is connected to the end of the cylinder 38 by a conduit 83. The exhaust chamber 81 is connected with atmosphere by a conduit 84. A sleeve 85 is rigidly supported by the diaphragm 80 by any suitable means and said sleeve slidably supports a tubular valve element 86 which has a closed end provided with one or more small openings. A spring 87 acts on the diaphragm to urge the same toward the right as viewed in Fig. 5. A spring pressed valve plunger 88 is located in the opening 78 and said plunger intermediate its ends is provided with a valve 89 located within the supply chamber 75 and normally closing the opening 78. The plunger 88 on its end within the pressure chamber 76 is provided with a valve 90 adapted to coact with the open end of the slidable element 86. The extended portion 39a of the valve casing is carried within the exhaust chamber 81 and said portion slidably supports a cup-shaped member 91 within which is mounted a strong coil spring 92 that contacts a flanged button-like member 93 having in its outer side a recess into which extends the end of the valve actuating plunger 74.

Figure 5:
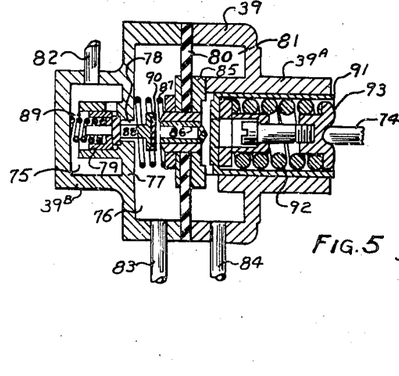
Fig. 5 is a detached sectional view through the valve of the chuck actuating mechanism and is taken substantially on line 5—5 of Fig. 2, looking in the direction of the arrows.

Referring to Fig. 5 it will be seen that when said actuating plunger 74 is moved toward the left the member 93 will be similarly moved and its motion transmitted through the spring 92 to the member 91 to move the latter toward the left with a resulting sliding movement of the valve element 86 into engagement with the valve 90 and a depression of the valve plunger 88 to unseat the valve 89. At this time pressure fluid will enter the supply chamber 75 through the conduit 82, flow through the opening 78 and into the pressure chamber 76, and thence through the conduit 83 to the cylinder 38, it being understood that no pressure fluid passes into the exhaust chamber 81 at this time, inasmuch as the element 86 is seated on the valve 90. When the mechanical pressure on the valve actuating plunger 74 is relieved the valve 89 is seated under the action of its spring and also the pressure of the pressure fluid within the supply chamber 75. As soon as the valve 89 seats the flow of pressure fluid to the pressure chamber 76 is terminated. However, the movement of the valve plunger 88 to seat the valve 89 moves the valve element 86 to the position shown in Fig. 5, with a resultant movement outwardly of the member 91. The element 86 and the valve 90 are separated due to the action of the spring 87 and the pressure of the pressure fluid within the pressure chamber 76. Consequently the pressure fluid may now flow through the element 86 and into the exhaust chamber 81 and thence to atmosphere through the conduit 84. Since the conduit 83 connects the pressure chamber 76 with the cylinder 38 it will be evident that the pressure fluid in the cylinder 38 may be vented to atmosphere through the conduit 83, pressure chamber 76, exhaust chamber 81 and conduit 84.

Figure 4:
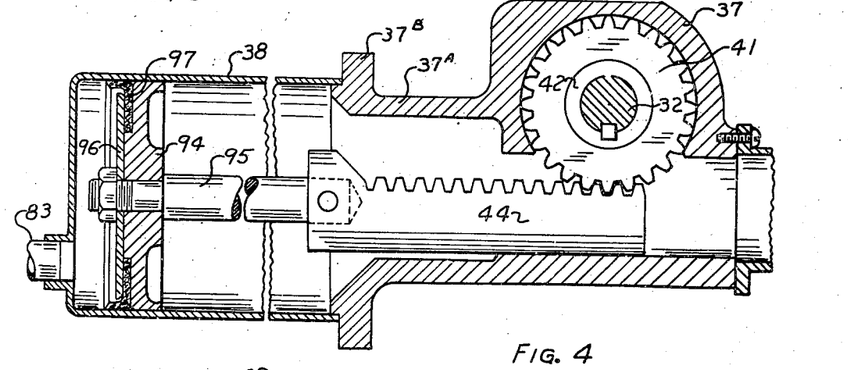
Fig. 4 is a sectional view taken substantially on line 4—4 of Fig. 2, looking in the direction of the arrows.

A piston 94 is slidably mounted in the cylinder 38 and is attached to the piston rod 95 by means of a nut screwed on the reduced threaded end of the piston rod and engaging a washer 96 which clamps a flexible cup packing 97 between it and the piston 94. The piston rod 95 at its free end is connected to the rack 44. It will be seen that when pressure fluid is admitted to the cylinder 38 through the conduit 83 the piston 94 will be moved from its left hand position indicated in Fig. 4 toward the right with a resultant movement of the rack 44 toward the right and consequently a rotation will be imparted to the gear 41 in an anticlockwise direction, with a corresponding movement of the shaft 32. When the shaft 32 rocks in an anticlockwise direction the chuck actuating mechanism is functioning to close the chuck and when said shaft rotates in a clockwise direction said mechanism is functioning to open the chuck. Of course when the shaft 32 and gear 41 rock in a clockwise direction the rack 44 will be moved toward the left to the position shown in Fig. 4 and during such movement the cylinder 38 will be vented through the valve 39 to atmosphere.

Figure 9:
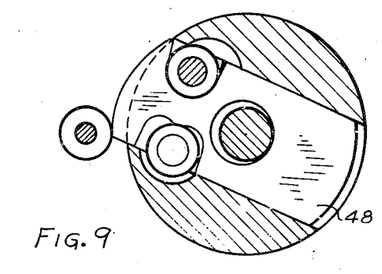
Fig. 9 is a view similar to Fig. 8 and shows the relationship of the parts after the operating handle of the chuck actuating mechanism has been manually moved from its chuck open position through a predetermined distance toward its chuck closed position and one wherein the application of the power derived force is initiated.

In order to coordinate the description heretofore set forth and to clearly bring out the advantages resulting from the invention, the operation of the structure embodying the invention will now be explained. Assuming that the collet is released and is not gripping the stock, the parts will be as indicated in dot and dash lines in Fig. 1, with the handle 66 extending toward the right and substantially horizontally. At this time the rack 44 will be substantially in the position shown in Fig. 4 and the cylinder 38 will be vented to atmosphere. Also at this time the shaft 32 will be in such position that the slide 48 carried by the member 45 is extending slightly to the right of a vertical position and is held by the spring 54, with the left hand side of the opening 49 in engagement with the shaft 32. When the operator desires to close the collet he moves the handle 66 in an anticlockwise direction. This causes the roller 68 mounted on the stud 67 to move with the handle and results in a rocking movement being imparted to the member 45 in an anticlockwise direction so long as the resistance to such movement is less than the force exerted by the spring 54. Consequently the first part of the rocking movement of the handle 66 causes an anticlockwise rocking movement to be imparted to the shaft 32 solely through the roller 68, member 45, slide 48 and the sleeve 42 of the gear 41. During this period the cam surface 69 of the slide 48 is inactive with respect to the roller 70. Of course, the anticlockwise rocking movement of the shaft 32 acts through the gear 41 to shift the rack 44 toward the right. In other words, the operation of the collet actuating mechanism is at first purely a manual operation and it is during such time that the cone 31 is shifted from the dot and dash line position of Fig. 1 toward the left to the point where the cone first contacts the rollers 30 carried by the fingers 27. This is the period that the stock is being axially fed through the collet by mechanism not shown but which will be understood in the art. The anticlockwise rocking movement imparted manually to the handle 66 is continued and when the cone 31 starts to spread the fingers 27 to shift the collet actuating sleeve 22 and initiate the closing movement of the collet spring jaws the resistance to the rocking of the shaft 32 and handle 66 attains to an amount greater than the force of the spring 54. Consequently the further anticlockwise rocking movement of the lever 66 causes the roller 68 to impart movement to the slide 48 relative to the member 45 and against the action of the spring 54. This movement of the slide 48 causes the cam surface end 69 of the slide to be extended beyond the circumference of the member 45 and into contact with the roller 70 as shown in Fig. 9. The rocking movement of the handle 66 continuing the member 45 and the slide 48 rock in unison therewith and the cam surface 69 on the end of the slide acts on the roller 70 to rock the lever 71 about its pivot 72 and to shift the valve actuating pin 74 toward the left with a resultant actuation of the valve 39 to seal the left hand end of the cylinder 38 from atmosphere and to cause the pressure fluid to flow into such end of the cylinder through the conduit 83. This results in a power movement of the piston 94 toward the right as viewed in Fig. 4 with a consequent movement of the rack 44 to drive the gear 41 in an anticlockwise direction and thus to superimpose upon the manual force rocking the shaft 32 a power derived force furnished by the pneumatic motor. This power derived force is applied during the time that the rollers 30 of the fingers 27 are riding on the conical surface of the cone 31 and which time is the period when the collet jaws are closing on the stock to tightly grip the same.

Figure 10:
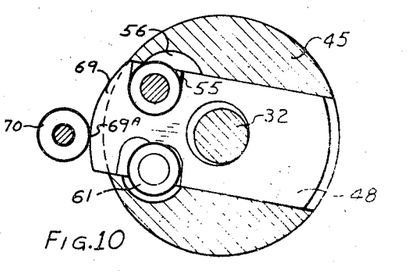
Fig. 10 is a view similar to Fig. 9 and shows the relation of the parts intermediate the initiating of the application of the power derived force and the complete closed condition of the chuck.
Figure 11:
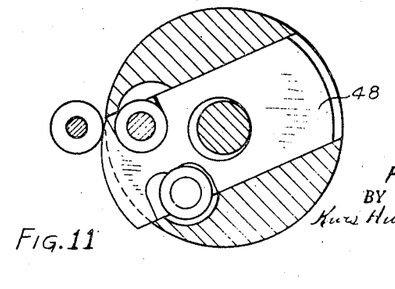
Fig. 11 is a view similar of Figs. 9 and 10 but shows the relation of the parts when the chuck is fully closed.

In Fig. 10 the roller 70 is indicated as engaging the high point 69a of the cam surface 69 and at such time the valve 39 is completely open and this is the time when the greatest force is required in closing the collet jaws. The operator continues the rocking movement of the handle 66 until the same is in the full line position of Fig. 1, at which time the collet jaws are tightly gripping the stock while the roller 70 has moved to the position shown in Fig. 11 with relation to the cam surface 69 of the slide 48 and is at the low point of said cam, wherefore the valve 39 has closed and the cylinder 38 is vented to atmosphere. During the last part of the anticlockwise movement of the handle 66 the rollers 30 are brought into contact with the cylindrical right hand end of the cone 31.

When the operator desires to release the chuck jaws from the stock the handle 66 is rocked in a clockwise direction, with the result that the roller 68 moving with the handle causes the slide to assume the relationship to the member 45 that is indicated in Fig. 8 and also causes said member 45 to rock in a clockwise direction with a corresponding rocking movement of the sleeve 42, gear 41 and shaft 32. Inasmuch as the cam surface 69 of the slide 48 is now out of contact with the roller 70, the valve 39 remains vented to atmosphere and therefore the clockwise rotation manually imparted to the gear 41 results in shifting the rack 44 toward the left and toward the position shown in Fig. 4. The clockwise movement of the handle 66 is continued until said handle is in the dot-dash line position of Fig. 1 and at such time the cone 31 has been shifted from its full line position into its dot-dash line position as will be well understood.

It will be noted that the roller 61 functions to guide the slide 48 and to act as a positive stop after the slide has moved relative to the member 45 to bring its cam surface 69 into engagement with the roller 70.

From the foregoing description it will have been seen that during the manual closing of the chuck and at a time when the force required becomes greatest a power derived force is automatically superimposed upon the manual force to facilitate the operation of the chuck actuating mechanism in the chuck closing direction. Consequently the operation of such mechanism is greatly facilitated and the operator does not have to exert any substantial effort to close the chuck to effectively and properly grip the stock. It will also have been noted that the operator is not called upon to manipulate any part other than the ordinary operating handle and thus he performs the chuck closing operation in the usual manner to which he is accustomed. It will also be seen that the chuck actuating mechanism can be operated entirely by manual operation should the supply of pressure fluid fail or should it be desired to operate the chuck without the use of the booster power derived force. The construction embodying the invention will greatly facilitate and increase the efficiency of operation of the chuck actuating mechanism.

Inasmuch as the operative connection between the hub 62 of the handle 66 and the member 45 is formed by the roller 68 carried by the hub and the cam slide 48 it will be understood that during the chuck closing operation and after the power motor is functioning a movement of the handle 66 in the chuck opening direction immediately relieves pressure on the cam slide 48 and the spring 54 then acts to move said slide toward its inactive position with a resultant closing of the contact valve in the pressure fluid line and hence a stopping of the power drive to the shaft 32; in other words, the stopping of the power drive at any time during the chuck closing operation is under the manual control of the operator.

Although a preferred embodiment of the invention has been illustrated and described herein it will be understood that the invention is susceptible of various modifications and adaptations within the scope of the appended claims.

Having thus described my invention, I claim:

1. In a machine tool, a support, a member carried by said support and provided with a chuck, actuating mechanism carried by said support for closing and opening said chuck and including a manually operated movable part, power means including a housing stationary with respect to said support and having a movable element therein, and operative connections between said power means movable element and said part wherefore the force of said power means may be applied to said part in addition to the manual force applied thereto.

2. In a machine tool, a support, a member carried by said support and provided with a collet chuck; actuating mechanism carried by said support for closing and opening said chuck and including an axially shiftable sleeve carried by said member, a manually operated movable part, and operative connections between said part and said sleeve; power means including a housing stationary with respect to said support and having a movable element therein, and operative connections between said power means movable element and said part wherefore the force of said power means may be applied to said part in addition to the manual force applied thereto.

3. In a machine tool, a support, a member carried by said support and provided with a chuck, actuating mechanism for said chuck carried by said support and including a manually operated part movable in opposite directions to effect closing and opening of said chuck, power means including a housing stationary with respect to said support and having a movable element therein, and operative connections between said power means movable element and said part effective during movement of said part in one direction to apply the force of said power means to said part in addition to the manual force applied thereto.

4. In a machine tool, a support, a member carried by said support and provided with a collet chuck carried by said support; actuating mechanism for said chuck and including an axially shiftable sleeve carried by said member, a manually operable part movable in opposite directions to effect closing and opening of said chuck, and operative connections between said part and said sleeve; power means including a housing stationary with respect to said support and having a movable element therein, and operative connections between said power means movable element and said part effective during movement of said part in one direction to apply the force of said power means to said part in addition to the manual force applied thereto.

5. In a machine tool, a support, a member carried by said support and provided with a chuck, actuating mechanism for said chuck carried by said support and including a manually operated part movable in opposite directions to effect closing and opening of said chuck, power means including a housing stationary with respect to said support and having a movable element therein, and operative connections between said power means movable element and said part effective during chuck closing movement of said part to apply the force of said power means to said part in addition to the manual force applied thereto.

6. In a machine tool, a support, a member carried by said support and provided with a collet chuck; actuating mechanism for said chuck carried by said support and including an axially shiftable sleeve carried by said member, a manually operated part movable in opposite directions to effect closing and opening of said collet chuck, and operative connections between said part and said sleeve; power means including a housing stationary with respect to said support and having therein a movable element, and operative connections between said power means movable element and said part effective during chuck closing movement of said part to apply the force of said power means to said part in addition to the manual force applied thereto.

7. In a machine tool, a support, a member carried by said support and provided with a chuck, actuating mechanism carried by said support for closing and opening said chuck and including a manually operated movable part, power means including a housing stationary with respect to said support and having a movable element therein, operative connections between said power means movable element and said part, control means for said power means, and operative connections between said control means and said part effective at a predetermined point in the manual operation of said part to render said power means active wherefore the force of said power means is applied to said part in addition to the manual force applied thereto.

8. In a machine tool, a support, a member carried by said support provided with a collet chuck, actuating mechanism carried by said support for closing and opening said chuck and including an axially shiftable sleeve carried by said member, a manually operated movable part, and operative connections between said part and said sleeve; power means including a housing stationary with respect to said support and having a movable element therein, operative connections between said power means movable element and said part, control means for said power means, and operative connections between said control means and said part effective at a predetermined point in the manual operation of said part to render said power means active wherefore the force of said power means is applied to said part in addition to the manual force applied thereto.

9. In a machine tool, a support, a member carried by said support and provided with a chuck, actuating mechanism for said chuck carried by said support and including a manually operable part movable in opposite directions to effect closing and opening of said chuck, power means including a housing stationary with respect to said support and having a movable element therein, operative connections between said power means movable element and said part, control means for said power means, and operative connections between said control means and said part effective at a predetermined point in the movement of said part in one direction to render said power means active wherefore the force of said power means is applied to said part in addition to the manual force applied thereto.

10. A machine tool as defined in claim 9 and wherein said chuck is a collet chuck and said actuating mechanism includes an axially shiftable sleeve carried by said member, and operative connections between said sleeve and said manually operable part.

11. In a machine tool, a support, a member carried by said support and provided with a chuck, actuating mechanism for said chuck carried by said support and including a manually operable part movable in opposite directions to effect opening and closing of said chuck, power means including a housing stationary with respect to said support and having a movable element therein, operative connections between said power means movable element and said part, control means for said power means, and operative connections between said control means and said part effective at a predetermined point in the chuck closing movement of said part to render said power means active wherefore the force of said power means is applied to said part in addition to the manual force applied thereto.

12. A machine tool as defined in claim 11 and wherein said chuck is a collet chuck and said actuating mechanism includes an axially shiftable sleeve carried by said member, and operative connections between said sleeve and said manually operable part.

13. A machine tool as defined in claim 9 and wherein the operative connections between said control means and said part are effective in the movement of said part in the opposite direction to render said power means inactive wherefore only the manual force is applied to said part in moving the same in said opposite direction.

14. A machine tool as defined in claim 11 and wherein said operative connections between said control means and said part are effective during the movement of said part in a chuck opening direction to render said power means inactive wherefore only manual force is applied to said part during the chuck opening movement thereof.

15. In a machine tool, a support, a member carried by said support and provided with a chuck, actuating mechanism for said chuck carried by said support and including a manually operable movable part, power means including a housing stationary with respect to said support and having a movable element therein, operative connections between said power means movable element and said part, control means for said power means, and operative connections between said control means and said part and including an element movable with said part when the resistance to the movement of said part is less than a predetermined amount and automatically movable relative to said part to actuate said control means and render said power means active when the resistance to the movement of said part exceeds said amount.

16. In a machine tool, a support, a member carried by said support and provided with a chuck, actuating mechanism for said chuck carried by said support and including a manually operable part movable in opposite directions, power means including a housing stationary with respect to said support and having a movable element therein, operative connections between said power means movable element and said part, control means for said power means, and operative connections between said control means and said part and including an element which moves with said part when the latter moves in one direction until the resistance to such movement of said part exceeds a predetermined amount and then automatically moves relative to said part to actuate said control means and render said power means active, said element moving with said part throughout the entire movement thereof in the opposite direction.

17. In a machine tool, a support, a member carried by said support and provided with a chuck, actuating mechanism for said chuck carried by said support and including a manually operable part movable in opposite directions to effect opening and closing of said chuck, power means including a housing stationary with respect to said support and having a movable element therein, operative connections between said power means movable element and said part, control means for said power means, and operative connections between said control means and said part and including an element movable with said part during chuck closing movement thereof until the resistance to such movement exceeds a predetermined amount and then automatically movable relative to said part to actuate said control means and render said power means active for the remainder of the chuck closing movement of said part, said element moving with said part during its entire chuck opening movement.

18. In a machine tool, a member provided with a chuck, actuating mechanism for said chuck and including a manually operated rockable part, power means, operative connections between said power means and said part, control means for said power means and including a movable actuating member, and operative connections between said actuating member and said part and including a member mounted on said part and rockable therewith, a slide carried by said last member and through which slide said part extends, with said slide having limited movement relative to said member and part and provided with a cam surface adapted to cooperate with said actuating member, means acting on said slide to cause the same to rock with said second member and part and to be inactive relative to said actuating member until the resistance to the movement of said part exceeds a predetermined amount whereupon said slide moves relative to said second member and said part and said cam surface acts on said actuating member to cause said control means to render said power means active.

19. In a machine tool, a member provided with a chuck, actuating mechanism for said chuck and including a rockable shaft, a handle mounted on said shaft for rocking the same manually, power means, operative connections between said power means and said shaft, control means for said power means, a member mounted on and rockable with said shaft and provided with a guideway extending transversely of said shaft, a slide mounted in said guideway and having an opening of larger diameter than said shaft and through which said shaft extends, said slide being provided in one edge with a recess and said member being provided with a recess cooperating therewith, said slide having a cam surface adapted to cooperate with said control means to actuate the latter, said handle being provided with means extending into said cooperating recesses, and said slide being provided with spring tensioned means engaging said shaft and acting to maintain said slide in inactive position wherein it rotates with said handle member and shaft, the tension of said spring tensioned means being such that when the resistance to rocking movement of said shaft exceeds a predetermined amount said slide moves in said guideway relative to said member and shaft and the cam surface thereof acts on said control means as the member and shaft continue to rock to activate said power means.

20. In a machine tool, a support, a member carried by said support and provided with a chuck, actuating mechanism carried by said support for closing and opening said chuck and including a manually operated movable part, a fluid motor including a housing stationary with respect to said support and having a movable element therein, operative connections between said movable element and said part, and control means for said motor and operatively associated with said movable part wherefore the force of said motor may be applied to said part in addition to the manual force applied thereto.

21. In a machine tool, a member provided with a chuck, actuating mechanism for closing and opening said chuck and including a manually operated movable part, a fluid motor, operative connections between said motor and said part, control means for said motor including a valve mounted independently of said actuating mechanism, and operative connections between said control means and said part effective at a predetermined point in the manual operation of said part to actuate said valve to render said motor active wherefore the force of said motor is applied to said part in addition to the manual force applied thereto.

22. In a machine tool, a member provided with a chuck, actuating mechanism for said chuck and including a manually operable part movable in opposite directions to effect closing and opening of said chuck, a fluid motor, operative connections between said motor and said part, control means for said motor including a valve mounted independently of said actuating mechanism, and operative connections between said control means and said part effective at a predetermined point in the movement of said part in one direction to actuate said valve to render said motor active wherefore the force of said motor is applied to said part in addition to the manual force applied thereto.

23. In a machine tool, a member provided with a chuck, actuating mechanism for said chuck and including a manually operable part movable in opposite directions to effect opening and closing of said chuck, a fluid motor, operative connections between said motor and said part, control means for said motor and including a valve mounted independently of said actuating mechanism, and operative connections between said control means and said part effective at a predetermined point in the chuck closing movement of said part to actuate said valve to render said motor active wherefore the force of said motor is applied to said part in addition to the manual force applied thereto.

24. In a machine tool, a member provided with a chuck, actuating mechanism for said chuck and including a manually operable movable part, a fluid motor, operative connections between said motor and said part, control means for said motor including a valve mounted independently of said actuating mechanism, and operative connections between said control means and said part and including an element movable with said part when the resistance to the movement thereof is less than a predetermined amount and automatically movable relative to said part to actuate said control means and render said motor active when the resistance to the movement of said part exceeds said amount.

25. In a machine tool, a member provided with a chuck, actuating mechanism for closing and opening said chuck and including a manually operated rockable shaft, a gear fixed to said shaft, a fluid operated piston and cylinder, a rack operatively associated therewith and meshing with said gear, and control means for said piston and cylinder and operatively associated with said shaft wherefore said fluid operated piston and cylinder applies torque to said shaft in addition to that applied thereto manually.

26. In a machine tool, a support, a member mounted in said support and provided with a chuck, actuating mechanism for closing and opening said chuck and including a manually operated rockable shaft, a housing secured to said support and through which said shaft extends, a fluid operated piston and cylinder secured to said housing, a valve secured to said housing for controlling the admission of pressure fluid to said cylinder and the venting thereof from said cylinder, a rack operatively connected with said piston and slidable in said housing transversely of said shaft, a gear fixed to said shaft and meshing with said rack, and means for actuating said valve and including an element rockable with said shaft and movable relative thereto.

27. A machine tool as defined in claim 26 and wherein said element may slide transversely relative to said shaft, and spring tension means is provided to restrain such sliding movement of said element until the resistance to the manual rocking of said shaft exceeds a predetermined amount.

28. In a machine tool, a support, a member movable therein and provided with a chuck, actuating mechanism for closing and opening said chuck and including a rockable shaft, a housing secured to said support and through which said shaft extends, a handle mounted on the outer end of said shaft, a gear fixed to said shaft within said housing, a rack slidably supported by said housing and meshing with said gear, a fluid operated piston and cylinder connected with said housing and operatively associated with said rack, a valve for controlling the admission of pressure fluid to said cylinder and the venting of the same therefrom, a member rockable with said shaft and provided with a diametrically extending guideway, a slide mounted in said guideway and provided with an opening of larger diameter than said shaft and through which said shaft extends, spring tensioned means carried by said slide and engaging said shaft and normally maintaining one side of said opening of said slide in engagement with said shaft, said slide and said member being provided with cooperating recesses and said slide having at one of its ends a cam surface, said handle having operatively associated therewith a roller located in said cooperating recesses, and means operatively associated with said valve and adapted to cooperate with said cam surface when said slide moves diametrically relative to said member and shaft to actuate said valve to cause pressure fluid to be admitted to said cylinder.

29. In a machine tool, a member provided with a chuck, actuating mechanism for said chuck and including a rockable shaft, a manually operated member freely movable on said shaft, a member operatively connected with said shaft to rock therewith, a shiftable element carried by said second member and normally held under spring tension in a predetermined position relative to said second member, said manually operated member carrying an element cooperating with said shiftable element to operatively interconnect said members, said shiftable element shifting relative to said second member when resistance to the rocking movement of said first member in one direction exceeds a predetermined amount, power means, operative connections between said power means and said shaft, and control means for said power means, said shiftable element cooperating with said control means when shifted from its normal position to render said power means active wherefore at any time when power means is active a reverse movement of said manually operated member results in said shiftable element returning to its normal position and in said power means becoming inactive.

30. In a machine tool, a support, a member carried by said support and provided with a chuck, actuating mechanism carried by said support for closing and opening said chuck and including a manually operated movable part, power means including a housing stationary with respect to said support and having a movable element therein, operative connections between said movable element and said part, control means for said power means, and operative connections between said control means and said part effective at a predetermined point in the manual operation of said part to render said power means active wherefore the force of said power means is applied to said part in addition to the manual force applied thereto.

31. In a machine tool, a support, a member carried by said support and provided with a collet chuck, actuating mechanism carried by said support for closing and opening said chuck and including an axially shiftable sleeve carried by said member, a manually operated movable part, and operative connections between said part and said sleeve; power means including a housing stationary with respect to said support and having a movable element therein, operative connections between said movable element and said part, control means for said power means, and operative connections between said control means and said part effective at a predetermined point in the manual operation of said part to render said power means active wherefore the force of said power means is applied to said part in addition to the manual force applied thereto.

32. In a machine tool, a support, a member carried by said support and provided with a chuck, actuating mechanism for said chuck carried by said support and including a manually operable part movable in opposite directions to effect closing and opening of said chuck, power means including a housing stationary with respect to said support and having therein a movable element, operative connections between said movable element and said part, control means for said power means, and operative connections between said control means and said part effective at a predetermined point in the movement of said part in one direction to render said power means active wherefore the force of said power means is applied to said part in addition to the manual force applied thereto.

33. In a machine tool, a support, a member carried by said support and provided with a chuck, actuating mechanism for said chuck carried by said support and including a manually operable part movable in opposite directions to effect opening and closing of said chuck, power means including a housing stationary with respect to said support and having a movable element therein, operative connections between said movable element and said part, control means for said power means, and operative connections between said control means and said part effective at a predetermined point in the chuck closing movement of said part to render said power means active wherefore the force of said power means is applied to said part in addition to the manual force applied thereto.

34. In a machine tool having a member provided with a chuck, actuating mechanism for said chuck and including a support, a manually rockable shaft carried by said support, and operative connections between one end of said shaft and said chuck, power means, operative connections between said power means and said shaft adjacent the other end of the latter, and control means independent of said operative connections between said shaft and chuck and operatively associated with said shaft and acting during rocking movement thereof to render said power means active.

35. In a machine tool having a member provided with a chuck, actuating mechanism for said chuck and including a support, a manually rockable shaft carried by said support, and operative connections between one end of said shaft and said chuck; a motor carried by said support and including a stationary housing and a movable element, operative connections between said movable element and said shaft, and control means carried by said support and independent of said operative connections between said shaft and chuck and operatively associated with said shaft and acting during manual rocking thereof to render said motor active.

FRED H. BOGART.

REFERENCES CITED

The following references are of record in the file of this patent:

UNITED STATES PATENTS

| Number | Name | Date |
| --- | --- | --- |
| 1,758,844 | Long | May 13, 1930 |
| 1,834,986 | Strawn | Dec. 8, 1931 |
| 2,366,908 | Jenkins | Jan. 9, 1945 |

FOREIGN PATENTS

| Number | Country | Date |
| --- | --- | --- |
| 397,274 | Great Britain | 1933 |
| 450,881 | Germany | 1927 |